United States Patent Office 3,437,358
Patented Apr. 8, 1969

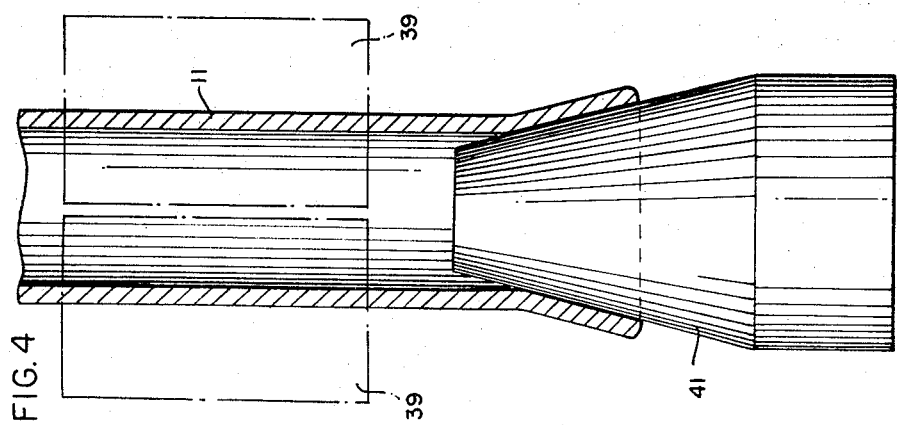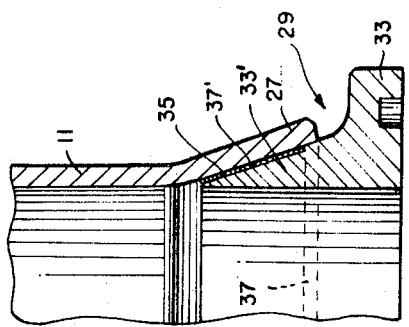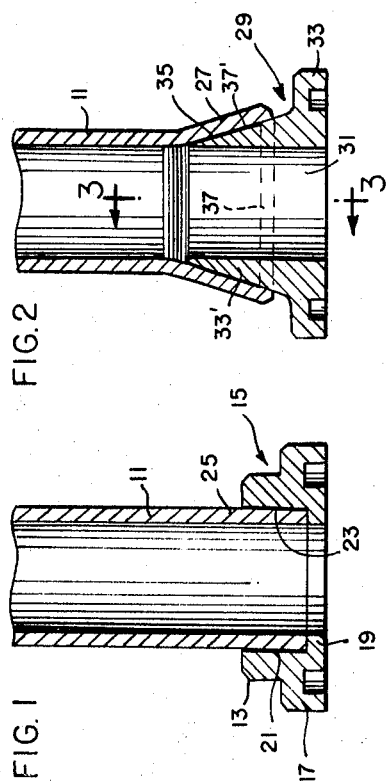

3,437,358
TUBE END CONNECTION
John R. Cepon, Wadsworth, Ill., assignor to Anchor Coupling Co., Inc., Libertyville, Ill., a corporation of Illinois
Filed Sept. 1, 1966, Ser. No. 576,632
Int. Cl. F16l 13/02, 47/02, 25/00, 35/00
U.S. Cl. 285—286                                    3 Claims

ABSTRACT OF THE DISCLOSURE

A tube structure embodying an outwardly flared tube with a tapered end fitting disposed in the flared portion in position to support the end of the tube, the tube being brazingly secured to the fitting throughout a portion of the length of the inner end of the latter.

---

The present invention relates in general to conduits or tubes, and has more particular reference to an improved tube end connection structure wherein an end of a tube or conduit is sealed to an end fitting to permit the tube to be connected with another conduit or ducted body.

An important object of the present invention is to provide an improved method and structure for connecting the end of a tube or conduit with an end fitting, the structure of the present invention affording appreciably extended failure-free service life as compared with conventional tube end structures of the sort heretofore provided.

Another object is to afford a novel tube end structure.

An object ancillary to the foregoing is to enable a fluid conduit to be connected to an end fitting therefor in a novel and expeditious manner.

Yet another object of the present invention is to afford a novel tube end structure having improved joint strength between the tube and a fitting as compared to tube end structures heretofore commonly available.

Another object is to enable sharp stress risers to be eliminated in hydraulic tubing, and the like, in a novel and expeditious manner.

The foregoing and other important objects, advantages and inherent functions of the invention will become apparent as the same is more fully understood from the following description, which, taken in connection with the accompanying drawings, discloses a preferred embodiment of the invention.

Referring to the drawings:

FIG. 1 is a sectional view through a conventional tube end structure;

FIG. 2 is a similar sectional view taken through an improved tube end construction embodying the present invention;

FIG. 3 is an enlarged sectional view taken substantially along the line 3—3 in FIG. 2; and FIG. 4 is a sectional view illustrating a method of expanding the end of a tube in forming the tube end construction of the present invention.

Fluid conduit conventionally consists of steel tubing fabricated to fit the requirements of the particular installation of which it is a part. Such steel tubing may be used by itself, with an appropriate end fitting brazed or otherwise formed on it, or the tubing may be used in conjunction with hydraulic hose as a part of a hose coupling. Regardless of how it is used, a limiting factor in the service life of tubing is fatigue failure, which occurs at a location of peak stress produced in the tubing as a result of stresses to which it is subjected, during its service life, and to the manner in which it is connected in a joint structure.

By way of illustration, FIG. 1 of the drawings discloses a common form of tube end structure, in which the end of a tube 11 extends in the hub portion 13 of an end fitting 15, the same having a flange portion 17 extending outwardly of the hub portion 13, and the tube end being secured in the fitting as by brazing it in place. To this end, the fitting may be formed with an inwardly extending flange 19 forming a seat for the end of the tube, the hub 13 defining a socket 21 sized to snugly yet slidingly receive the tube sufficiently loosely to permit brazing material 23 to penetrate between and integrate the end portions of the tube with the facing surfaces of the fitting.

In such a structure, failure usually, if not invariably, occurs in the tube at the locus 25, where it extends outwardly of the hub 13. The hub, being of relatively massive cross sectional dimension as compared with the wall thickness of the tube, holds the tube end portions rigidly, thereby causing such bending loadings as may be induced in the tube, during its service life, to be applied at the locus 25. Such bending loadings may result from many causes, including hydraulic pressure, installation misalignment, mechanical deflection under load, other external loadings and the like. Vibration that may be induced in the tube, during its service life, which produces stresses of reversing character, may be caused by hydraulic surges or pulsations, mechanical vibration, harmonic frequencies and the like. The ultimate effect of high stress intensity, produced at the locus 25, is to end the service life of the tube through cracking and rupture, as the result of fatigue failure of its constituent material at the locus 25 of maximum stress, the service life of the tube being dependent upon the strength of the tube material, the intensity of applied stresses and the frequency of applied vibration.

A common and obvious expedient employed to increase tube resistance to fatigue failure consists in providing stronger tubes made of material having higher stress resisting characteristics; but such expedient involves higher costs of material and fabrication; and there are, of course, limits to the strength of even the best tube material obtainable.

As shown in FIGS. 2, 3 and 4, the present invention seeks to increase tube life and resistance to fatigue failure by forming the tube 11 with a conically flared end 27 and by providing an end fitting 29 for brazed integration with and within the flared end portions 27 of the tube. To this end, the fitting 29 may comprise a sleeve having a channel 31 therethrough, which channel preferably has a diameter substantially equal to that of the tube 11. At one end, the sleeve may be formed with an outstanding peripheral flange 33 and an integral portion 33' extending from the flange to the flange remote end of the sleeve, the outer surfaces of the portion 33' being conically tapered to fit snugly within the flared end portions 27 of the tube.

The outer conical surfaces of the portion 33' may be relieved to provide an undercut portion 35, at and inwardly of the flange remote end of the sleeve, said undercut portion defining a circumferential land 37, at the flange adjacent side of said undercut portion, in position to engage and support the terminal edges of the flared portion 27 of the tube, whereby the surfaces of said flared portion, inwardly of its terminal end, may be spaced sufficiently outwardly of said undercut portion 35 of the fitting to permit the entry therebetween of brazing material 37', which serves to integrate and seal together said undercut portions of the fitting 29 and the overlying conically flared portions 27 of the tube.

The effect of flaring the end of the tube is to increase its section modulus. The gradual increase of the section modulus thus attained prevents the occurrence of stress risers, that is to say, excessive stress in a localized area or zone of the tube. The brazing of the tapered portion 33' of the end fitting to the inner surface of the tube, at its flared end, also provides a connection of gradually increasing overall thickness, as distinguished from the abrupt increase in thickness afforded by the hub portion 13 of the structure shown in FIG. 1. As a consequence, the structure shown in FIG. 2 produces no sharp stress riser, or sharply defined locus of excessive bending stress, such as that which occurs at the locus 25, in the arrangement shown in FIG. 1. Furthermore, the brazed joint clearance space, machined on the end fitting, at the undercut portion 35, insures the formation of a brazed joint of constant depth and uniform concentricity, thereby producing unusual joint strength between tube and fitting.

Rotating beam comparison fatigue tests have shown that the structure illustrated in FIGS. 2 and 3 provides far greater resistance to fatigue failure, and, consequently, substantially longer service life, when compared with the conventional structure illustrated in FIG. 1. This extensive improvement is thought to be due to the stress relieving effect of the flared tube end together with the gradual change in the section modulus of the joint resulting from the progressively increasing diameters of the flared tube and of the tapered portions of the fitting.

The structure shown in FIGS. 2 and 3 is easily manufactured at low cost and requires no machining after the brazing of the fitting to the tube. The tube end may be flared in the manner shown in FIG. 4 of the drawing, by gripping the tube in a pair of clamping jaws 39, and then forcing a tapered flaring die or punch 41 into the end of the tube, until it has been expanded to the desired extent.

While the drawings show and the specification refers to a flanged end fitting, it should be understood that the invention may be applied to any style of end fitting and is not necessarily limited to the flanged type.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of demonstrating the invention.

The invention is hereby claimed as follows:

1. A tube end structure comprising a tube formed with a conically flared end, a circumferentially continuous channeled end fitting having a conically tapered portion extending within the flared end of said tube, said tapered portion being undercut from the extremity of the inner end thereof to a portion thereon providing a peripheral land on said fitting in face to face engagement with said tube and supporting the terminal edges of said flared end of said tube, said undercut providing an area between said undercut portion of said fitting and the facing inner surface portions of said flared end of said tube wherein said fitting and tube are spaced from each other, and brazing material in said area and brazingly securing together the facing surfaces of said tube and said fitting.

2. A tube end structure as defined in claim 1, and in which said area is of uniform thickness between said fitting and tube from said land to said inner end of said tapered end.

3. A tube end structure as defined in claim 1, and in which said undercut portion extends peripherally around said tapered portion.

References Cited

UNITED STATES PATENTS

| | | | |
|---|---|---|---|
| 535,236 | 3/1895 | Anderson | 285—334.5 X |
| 1,935,425 | 11/1933 | Wiggins | 285—334.5 X |
| 2,125,324 | 8/1938 | Williams | 285—334.5 X |
| 2,646,995 | 7/1953 | Thompson | 285—287 X |
| 3,032,870 | 5/1962 | Rohrberg et al. | 285—286 X |
| 1,960,249 | 5/1934 | Mano | 285—292 |

CARL W. TOMLIN, *Primary Examiner.*

DAVE W. AROLA, *Assistant Examiner.*

U.S. Cl. X.R.

285—334.5